June 29, 1954  W. G. RIEN ET AL  2,682,435
SPLIT ROLLER BEARING ASSEMBLY
Filed July 17, 1953

HOWARD J. RIEN
WALTER G. RIEN
*INVENTORS*

BY
Mellin and Hanscom
ATTORNEYS

Patented June 29, 1954

2,682,435

UNITED STATES PATENT OFFICE 2,682,435

SPLIT ROLLER BEARING ASSEMBLY

Walter G. Rien, Oakland, and Howard J. Rien, Berkeley, Calif.

Application July 17, 1953, Serial No. 368,793

6 Claims. (Cl. 308—186)

This invention relates to a split roller bearing of the pillow block type, and particularly to a bearing which may be removed and replaced without disturbing a shaft journaled in said bearing.

It is among the objects of the present invention to provide a bearing in which the bearing elements are split into matching sections, whereby the bearing may be assembled around a shaft without disturbing the position of the shaft.

Another object of the invention is to provide a sectional bearing in which outer race sections are embraced between a pillow block and a separable cap, the sections being held against rotation relative to the block and cap, and also being held against axial movement relative to each other and to the block and cap.

A further object is to provide a sectional bearing of the character described wherein plates are provided for positioning the bearing sections within a journal mounting to retain the parts in operative relationship, to prevent the entry of dirt and foreign matter into the bearings, and to absorb axial thrust and minimize end play within the bearing.

Another object is to provide a split roller bearing having improved lubricating means.

A still further object is to provide a split roller bearing which will facilitate assembly and disassembly, and which is of light, durable and economic construction.

The invention has other objects and features of advantage, some of which with the foregoing will be explained in the following description of that form of the invention illustrated in the drawings. It is to be understood that the invention is not limited to the embodiment shown in the drawings as it may be otherwise embodied within the definition of the appended claims.

Figure 1:
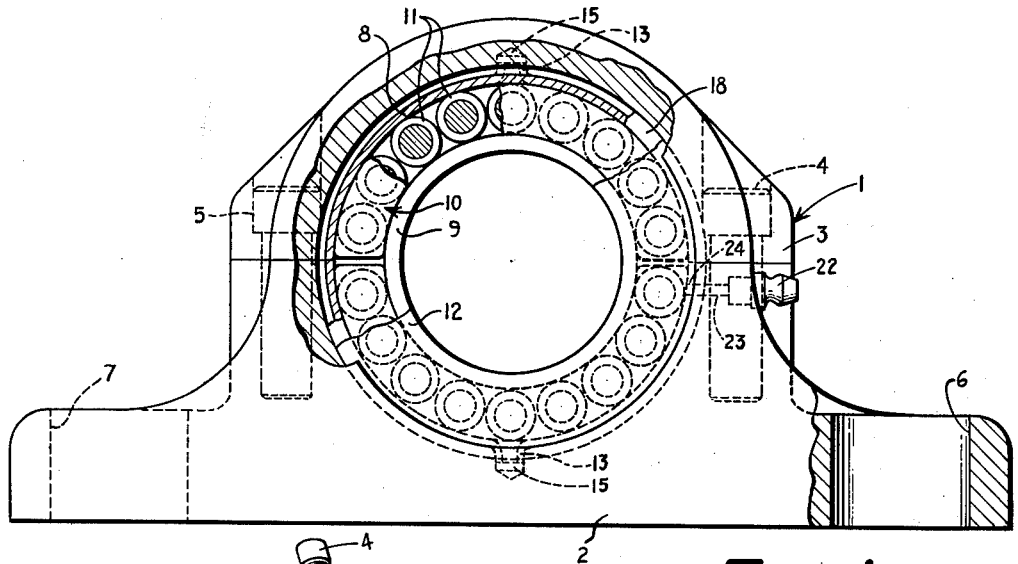
Fig. 1 is an end view of a bearing assembly embodying the principles of my invention, certain parts being broken away to reveal the detail of parts therebehind.
Figure 2:
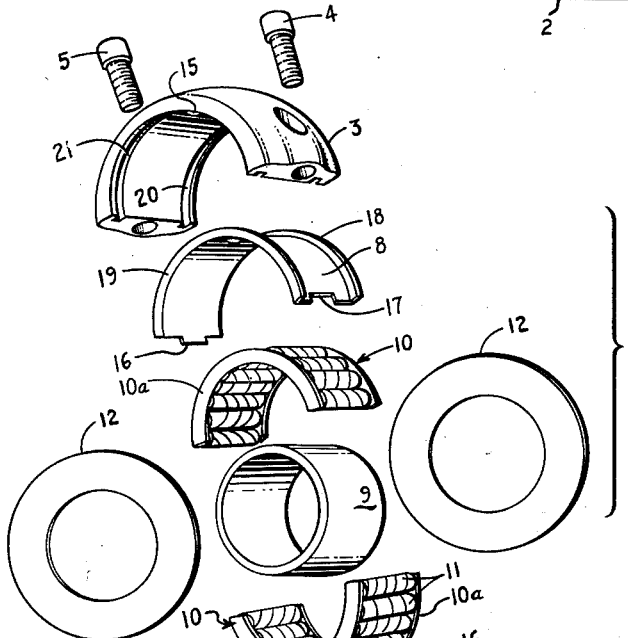
Fig. 2 is an exploded view showing the parts separated but arranged in the order of their relative positions in the assembly.
Figure 3:
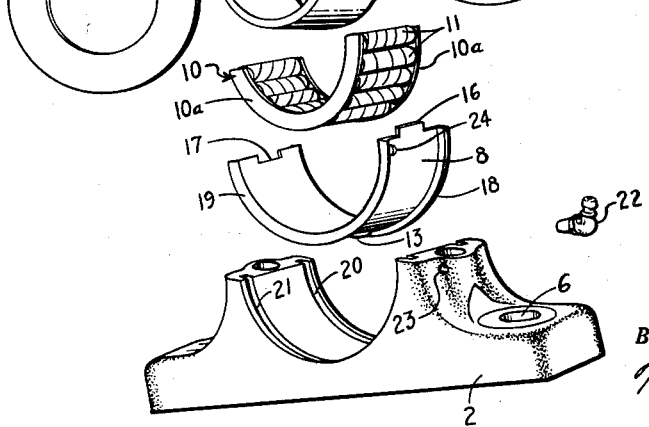
Fig. 3 is a fragmental sectional detail illustrating the interengaging lug and recess means for preventing rotation of the outer race.

The device of the present invention comprises a bearing assembly, generally designated by the numeral 1, and includes a lower pillow block section 2 and a cap portion 3, which is adapted to be secured to said lower portion by means of cap screws 4 and 5 extending through suitable openings in said cap and threaded into the lower portion 2 of the pillow block assembly. The lower portion 2 of the pillow block assembly is provided with suitable elongated openings 6 and 7 through which bolts or screws may be applied for securing the block to the base of a machine, or other device, on which the bearing assembly is to be mounted. The blocks and cap are preferably made of cast aluminum, heat treated to give strength and lightness.

A pair of matching roller bearing assemblies, designated in general by the numeral 10, embrace an inner annular race 9 and are embraced by a pair of matching outer race sections 8 seated between the block 2 and cap 3. Each bearing assembly is substantially semi-circular in cross-section, and includes a plurality of rollers 11 assembled between cage members 10a by which the rollers are held in freely rotatable relation, parallel to the axis of the bearing. The assembled units are substantially identical so that the units may be reversed and/or interchanged as desired. The rollers 11 are of hardened tool steel, and are machined or ground to very close dimensional limits.

The outer race sections 8 are provided with matching annular flange portions 18 and 19 on their ends, arranged to be engaged within annular grooves 20 and 21 respectively, formed within the pillow block 2 and cap 3. A tongue 16 is formed upon a longitudinal edge of each race section 8 to interengage with a corresponding recess 17 formed in the adjacent matching edge of the opposing section of the pair. Also, projections 13, preferably formed by outwardly punching central areas of the sections, are arranged to interengage with recesses 15 drilled or otherwise formed in corresponding positions within the pillow block and cap. The projections 13 position the race sections 8 and hold them against rotation within the pillow block and cap. The interengaging tongues 16 and recesses 17 hold the race sections against axial movement relative to each other. Also the tongues and recesses interrupt the line of engagement along which the race sections meet, and prevent, or reduce to a point where it becomes negligible, the brinelling action which ordinarily occurs where rollers operate over a straight line split.

End plates 12 are seated in the grooves 20 and 21 over the ends of the outer race sections 8, and the bearing assemblies and inner race embraced thereby. The grooves 20 and 21 are of a width sufficient to accommodate both the plates 12 and flanges 18 and 19. The plates 12, which may be of a fibrous material impregnated with plastic, or other suitable material, serve to seal the ends of the bearing against the entry of dust, and also serve as thrust plates for absorbing thrust and minimizing end play due to expansion and contraction of the shaft or bearing.

The bearing is lubricated through a suitable fitting 22, pressed or otherwise securely fitted into a passage 23 communicating with the bearing assemblies through an opening 24 in the lower outer race section 8. Grease or oil introduced through the fitting 22 enters the lower portion of the bearings where the greatest amount of wear occurs.

The several parts of the bearing assembly of the present invention are of a character such that they may be made in standard sizes, and stocked for use for replacement of worn or damaged parts as required. The sectional parts may be readily assembled over a shaft with a minimum of time and labor, and without otherwise disturbing the mountings and connections of the shaft. The pillow block and cap may be shaped to meet special requirements, and may be made of material of weight and strength suitable for all service for which the bearing is intended. The bolts and screws by which the bearing is assembled and mounted are preferably sufficiently inset or countersunk to give a smooth exterior and minimize the hazards presented by outwardly extending obstructions.

Having thus described our invention, what we claim as new and desire to secure by Letters Patent is:

1. A bearing assembly comprising a pillow block and cap having spaced internal annular grooves, a pair of separable matching roller bearing sections, an inner race embraced by the bearing sections, a sectional outer race embracing the bearing sections, and flanges on the outer race sections engaging the grooves of the pillow and cap.

2. A bearing assembly comprising a pillow block and cap having spaced internal annular grooves, a pair of separable matching roller bearing sections, an inner race embraced by the bearing sections, a sectional outer race embracing the bearing sections, flanges on the outer race sections engaging the grooves of the pillow and cap, and dust excluding means abutting the flanges.

3. A bearing assembly comprising a pillow block and cap having spaced internal annular grooves, a pair of separable matching roller bearing sections, an inner race embraced by the bearing sections, a pair of matching outer race sections embracing the bearing sections, flanges upon the ends of the outer race sections engaging the grooves of the pillow block and cap, and thrust plates seating within the grooves in abutting engagement with the ends of the race and bearing sections.

4. A bearing assembly comprising a pillow block and cap having spaced internal annular grooves, a pair of separable matching roller bearing sections, an inner race embraced by the bearing sections, a pair of matching outer race sections embracing the bearing sections, flanges upon the ends of the outer race sections engaging the grooves of the pillow block and cap, thrust plates seating within the grooves in abutting engagement with the ends of the race and bearing sections, and interengaging tongues and notches upon adjacent longitudinal edges of the outer race sections.

5. A bearing assembly comprising a pillow block and cap having spaced internal annular grooves, a pair of separable matching roller bearing sections, an inner race embraced by the bearing sections, a pair of matching outer race sections embracing the bearing sections, flanges upon the ends of the race sections engaging the grooves of the pillow block and cap, thrust plates seating within the grooves in abutting engagement with the ends of the race and bearing sections, and interengaging lugs and recesses on contacting peripheral surfaces of the outer race sections and the pillow block and cap.

6. A bearing assembly comprising a pillow block and cap having spaced internal annular grooves, a pair of separable matching roller bearing sections, an inner race embraced by the bearing sections, a pair of matching outer race sections embracing the bearing sections, flanges upon the ends of the race sections engaging the grooves of the pillow block and cap, thrust plates seating within the grooves in abutting engagement with the ends of the race and bearing sections, interengaging tongues and grooves upon adjacent longitudinal edges of the outer race sections, and interengaging lugs and recesses on opposing peripheral surface areas of the outer race sections and the adjacent pillow block and cap sections.

References Cited in the file of this patent

UNITED STATES PATENTS

| Number | Name | Date |
| --- | --- | --- |
| 926,966 | Shirley | July 6, 1909 |
| 1,481,705 | Gimeno | Jan. 22, 1924 |